United States Patent [19]

Chan

[11] 4,344,454
[45] Aug. 17, 1982

[54] VALVE BONNET FOR HIGH TEMPERATURE SERVICE

[75] Inventor: John C. H. Chan, Houston, Tex.

[73] Assignee: Houston Systems Manufacturing Co., Inc., Houston, Tex.

[21] Appl. No.: 268,824

[22] Filed: Jun. 1, 1981

[51] Int. Cl.$^3$ ............................................. F16K 43/00
[52] U.S. Cl. ............................... 137/315; 29/157.1 R; 285/187; 285/DIG. 6
[58] Field of Search ................................ 137/315, 15; 29/157.1 R, 402.03; 138/97; 285/187, DIG. 6

[56] References Cited

U.S. PATENT DOCUMENTS

| | | | |
|---|---|---|---|
| 2,017,600 | 10/1935 | Lofton | 137/315 |
| 2,065,628 | 12/1936 | Taylor et al. | 29/157.1 R |
| 2,649,315 | 8/1953 | Ipsen | 285/DIG. 6 |
| 2,695,184 | 11/1954 | Hobbs | 285/187 |
| 2,764,266 | 9/1956 | Haworth | 285/187 |
| 3,746,374 | 7/1973 | Sedgwick et al. | 285/DIG. 6 |
| 3,927,960 | 12/1975 | Endersen | 285/187 |
| 4,033,550 | 7/1977 | Wheatley et al. | 251/328 |
| 4,054,978 | 10/1977 | Freeman et al. | 29/157.1 R |
| 4,153,067 | 5/1979 | Ray | 137/315 |
| 4,185,857 | 1/1980 | Saracco | 285/187 |

Primary Examiner—George L. Walton
Attorney, Agent, or Firm—John D. Watts

[57] ABSTRACT

The object of the invention is to provide means to connect a valve bonnet with a valve that controls the flow of high temperature fluids such that, no leakage occurs and such that removable assembly may be accomplished without the use of large wrenches and high torques.

From the bonnet depends a flange (50) formed so as to encompass the end of the valve body wall (35) so as to allow the end of the flange to be welded to the valve body wall as at (58) so as to seal between the body and bonnet and to withstand fluid and mechanical forces there between and to minimize thermally generated forces there between.

The flange is made long enough to allow for a plurality of removals and reattachments and still be sufficiently flexible to relieve thermal stresses between the body and the bonnet.

7 Claims, 5 Drawing Figures

U.S. Patent  Aug. 17, 1982  4,344,454
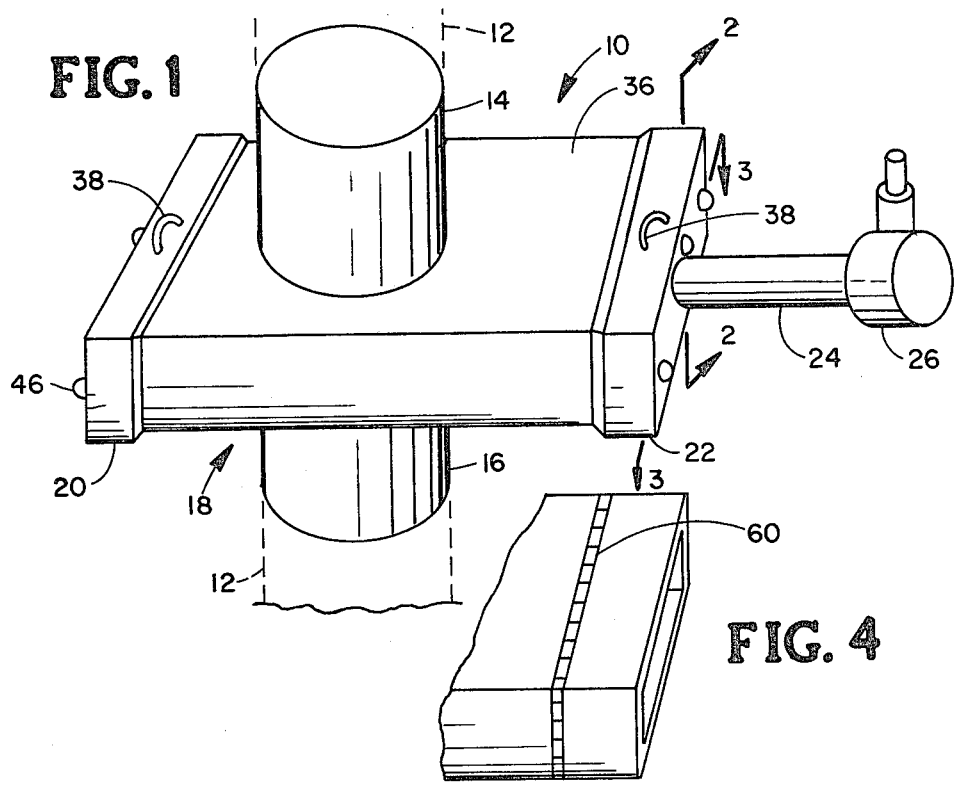
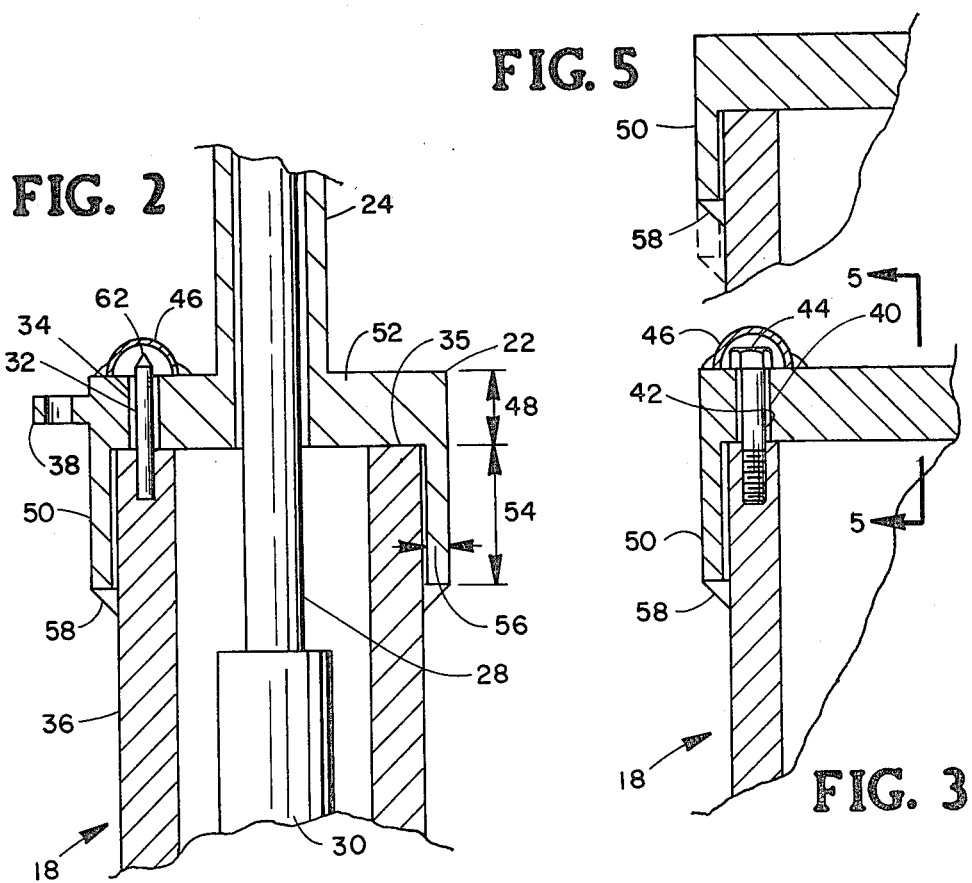

VALVE BONNET FOR HIGH TEMPERATURE SERVICE

DESCRIPTION

1. Technical Field

The present invention relates to valves used to control the flow of high temperature fluids and particularly to large valves fabricated from steel and other suitable materials.

The flow of fluids is controlled by adjusting conventional valve closure means with respect to valve seat means within a valve and therefore, at high temperatures, extreme wear rates on the seat and closure means may occur and thereby prevent proper functioning of the valve and in turn, necessitate repair or replacement of the seat and closure means.

Should it be necessary to remove a large valve from a high temperature process plant in order to repair it, the loss of process time may cost many times the cost of the valve and therefore it is highly desirable to be able to remove and reinstall valve seats and closure means without the necessity of removing the valve from its mounting with adjacent pipes or other conduit members. To that end, valve bonnet connections are usually bolted onto the valve body which necessitates a gasket seal and many bolts to pull the bonnet evenly around the gasket. However, due to thermal cycling during operation of the high temperature service, differential thermal expansion occurs between the body and bonnet which very often causes leakage through the gasket which damages the equipment and in many cases precipitates a very dangerous situation. Such leakage occurs often in high temperature service industries and it is of great importance to provide a valve bonnet closure that: may be disassembled and reassembled in the field for repair of the valve without removal of the valve from its service mounting; does not require the use of heavy hand tools; that does not leak under conditions of fluxuating temperatures and pressures.

2. Background Art

Prior art, U.S. Pat. No. 3,957,246 filed May 18, 1976 shows a fabricated valve body with flange (22) connected with bonnet flange (26), both flanges having most of their mass outwardly from the flange bolts so as to minimize deflection of the body (11) when subjected to operating stresses. The flange bolts serve to hold the bonnet in place as well as hold pressure on the gasket so as to seal between the bonnet and the valve body.

U.S. Pat. No. 2,956,580 filed Sept. 13, 1955 discloses valve body (11) connected with bonnet (12) by means of a flange connections held together by bolts and nuts (23).

Both examples of prior art above meet the problem of differential expansion between the flanges connected together by providing similar flanges and extended structures beyond the bonnet as at (12) such that the flanges may expand and contract together. However, a bonnet connection as depicted by U.S. Pat. No. 4,033,550 filed July 5, 1977 could not expand and contract uniformly when subjected to thermal stresses because flange (58) has a much greater radial rigidity than does body (12) and also body (12) would operate at a higher temperature than would flange (58) due to greater contact with the fluid. However, applicant has found that a structure similar to the latter patent is more suitable for large high temperature valves because of improved accessability and because less damage to insulation is experienced during removal of the bonnet. It is therefore an object of the present invention to provide a non-semetrical bonnet connection for large, high temperature valves that is capable of maintaining a seal under conditions of substantial differential thermal stresses and which is also relatively easy to assemble under difficult field conditions, without the use of heavy hand tools.

DISCLOSURE OF INVENTION

The present invention comprises a bonnet connection for a fabricated valve used to control the flow of high temperature fluids, the valve side of the bonnet connection being substantially an extended portion of the valve body wall formed around a bonnet opening as is necessary to removably install the valve seat and valve closure member within the valve bore. The bonnet comprises: an end portion of such size as is necessary to close the bonnet opening and to withstand mechanical, thermal and fluid pressure forces imposed on the bonnet; a relatively thin flange projecting from the end portion and disposed around a portion of the valve body wall forming the bonnet opening; the thin flange having a length greater than twice its thickness; the end of the thin flange being welded to the valve body wall so as to seal against fluid pressure and hold the bonnet against mechanical operating forces; the thin flange being flexible enough so as to allow for differential thermal stresses and strains; the thin flange being long enough such that it may be cut from and rewelded to the valve body more than once without adversely affecting operation of the valve so as to allow for replacement of valve seat means and valve closure means within the valve bore.

BRIEF DESCRIPTION OF THE DRAWINGS

FIG. 1 is a perspective view of a high temperature fabricated valve having bonnet connections according to the present invention.

FIG. 2 is a fragmentary section view taken along line 2—2 of FIG. 1.

FIG. 3 is a fragmentary section view taken along line 3—3 of FIG. 1.

FIG. 4 is a fragmentary view of the valve body with bonnet 22 removed there from.

FIG. 5 is a fragmentary view taken along line 5—5 of the view in FIG. 3.

BEST MODE FOR CARRYING OUT THE INVENTION

Referring to FIG. 1 a high temperature fabricated valve 10, mounted with vertical pipe 12, comprises: conduit members 14 and 16 formed on body 18; end caps 20 and 22 welded on ends of body 18; valve neck 24 mounted with end cap 22 and valve actuator 26 mounted on neck 24. Valve body 18 contains conventional seat and closure members not shown, the closure member being removably positioned into sealing engagement with the valve seats by means of a stem operating within neck 24 and selectively driven by actuator 26 as is well known in the art. A bonnet connection according to the present invention may be positioned as at 20, as at 22 or in both positions as desired for specific installations. A bonnet connection as at 20 will allow closer access so as to removably install conventional valve seats within the valve body and around the conduit openings, where as a bonnet positioned as at 22 will allow for removal of the valve neck 24 which is mounted therewith.

So as to precisely position bonnet 22 with respect to side 36 of body 18 and thereby provide for best operation of valve stem 28 and closure member 30 shown in FIG. 2, pin 32 is mounted with body 18 to closely mate with receptical 34 formed within bonnet 22 and thereby guide bonnet 22 into proper position against body surface 35. For lifting bonnets 20 or 22 onto or from body 18, lugs as at 38 may be provided for attachment of a suitable crane hook or the like which sometimes is most necessary as when a valve mounted in a process plant is mounted high above the ground and must be repaired in place.

To hold a bonnet in place while it is being welded to or cut from a valve body, small studs as at 40 may be mounted with body 18 so as to cooperate with aperture 42 through the bonnet shown in FIG. 3, to receive nuts 44 which may be made tight against the outer surface of the bonnet. To prevent leakage through receptical 34 or aperture 42, cups as at 46 may be welded to the bonnet outer surface around pin 32 and nuts 44. Studs 40 need be only large enough to support the bonnet weight.

Bonnets may have substantial thickness at end portions 52 as at 48 so as to withstand pressure, mechanical and thermal operating loads. Flange 50 depending from end portion 52 has length as at 54 and depth 56, so as to allow flange 50 to be cut off and rewelded as shown in FIG. 5 one or more times and still have a length greater than twice the flange thickness. FIG. 4 illustrates a body end having the bonnet removed after the flange to body weld 58 has been cut off as at 60.

Operation of the invention may be as follows: It is required that a valve mounted far above the ground with pipe 12, have its seats and closure member replaced without dismounting the valve body. A lifting hook is secured within lug 38 to support the bonnet weight after removal. A hand held cutting torch is used to wash-out weld 58 and seal welds around caps 46. Nuts 44 may then be removed with a small wrench, after which the bonnet may be urged off the end of the valve body and then lowered to the ground by the lifting hook. After removal of the valve seats and closure means by conventional means, new or repaired seats and closure means may be installed in a conventional manner. The bonnet is again lifted by placing a lifting hook in lug 38 and receptical 34 is positioned to register with pin 32 which may be provided with taper 62 so as to assist in alignment of the parts. The bonnet is pushed toward valve body 18 such that pin 32 enters receptical 34 to thereby align the bonnet with respect to the valve body. The bonnet is then pushed toward the valve body such that bolts 40 enter apertures 42 and until end portion 52 contacts body surface 35 to thereby fully and accurately position the bonnet with respect to the body. Nuts 44 are then threaded and tightened onto studs 40 so as to firmly hold the bonnet in position against its weight. A hand held welding apparatus is then used to reattach flange 50 to the body by means of a weld as at 58 in FIG. 5 so as to seal between the bonnet and the body and to support against fluid, mechanical and thermal stresses. Caps 46 may then be reattached to the bonnet so as to prevent leakage through receptical 34 or through aperature 42.

Thus it is clear that the present invention provides the foregoing and other advantages will be obvious to those skilled in the repair of high temperature valves. Other embodiments of the present inventions will be obvious to those skilled in the art upon study of this disclosure.

I claim:

1. A bonnet connection on the body of a valve used to control the flow of hot fluids comprising: a lateral opening through the body wall connecting with the valve bore; a laterally extended portion of the body wall formed around the lateral opening; the opening being sufficient to allow for the removable installation of valve seat means and valve closure means within the valve bore; a valve bonnet comprising a substantially rigid end portion and a substantially flexible flange formed to be positioned relative to the laterally extended portion of the valve body so as to allow for proper operation of the valve closure means; the flange depending from the end portion and extending around and adjacent to the laterally extended portion of the body wall such that the laterally extended portion of the body wall may be attached to the flange by welding so as to seal between the bonnet and the body and retain the bonnet with the body for proper operation of the valve, the flange being substantially thinner than the extended portion of the body wall and a space being defined between the flange and the body wall such that substantial differential thermal expansion of the body wall may occur without causing substantial movement of the end portion.

2. The invention of claim 1 further comprising: the flange being of sufficient strength to retain the bonnet with the body against all normal operating forces tending to move the bonnet relative to the body.

3. The invention of claim 1 or 2 wherein the flange is of sufficient length to allow for a plurality of bonnet removals and reattachments by means of cutting the flange from the body and rewelding thereto.

4. The invention of claim 1 further comprising: alignment means to facilitate proper positioning of the bonnet relative to the extended portion of the valve body.

5. The invention of claim 4 further comprising means to retain the bonnet in proper position such that the bonnet may be sealably attached to the body by welding the body wall to the flange.

6. The invention of claim 4 wherein the means to align the bonnet member with the body member comprises: a dowel pin mounted with one of the members and a cooperating recepticle in the other member; the recepticle sized and positioned so as to guide the bonnet into proper position with respect to the body for proper operation of the valve closure means; such that no leakage can occur from the valve through the recepticles.

7. The invention of claim 5 wherein the means to retain the bonnet in proper position before welding comprises: one or more bolts mounted with the body and a like number of cooperating apertures formed in bonnet; each bolt being of sufficient length to project through a cooperating aperture when the bonnet is positioned in operating position with respect to the body such that a nut may be assembled with the bolt and thereby retain the bonnet with a body against forces that may be encountered during reversible welding of the bonnet to the body wall.

* * * * *